(12) United States Patent
Corcoran et al.

(10) Patent No.: US 7,308,103 B2
(45) Date of Patent: Dec. 11, 2007

(54) POWER LINE COMMUNICATION DEVICE AND METHOD OF USING THE SAME

(75) Inventors: Kevin F. Corcoran, Middletown, MD (US); James Douglas Mollenkopf, Fairfax, VA (US)

(73) Assignee: Current Technologies, LLC, Germantown, MD (US)

( * ) Notice: Subject to any disclaimer, the term of this patent is extended or adjusted under 35 U.S.C. 154(b) by 810 days.

(21) Appl. No.: 10/434,024

(22) Filed: May 8, 2003

(65) Prior Publication Data

US 2004/0223617 A1 Nov. 11, 2004

(51) Int. Cl.
| | |
|---|---|
| *H04L 9/00* | (2006.01) |
| *H04J 3/24* | (2006.01) |
| *H04Q 7/20* | (2006.01) |
| *H02J 13/00* | (2006.01) |
| *H04B 3/56* | (2006.01) |
| *H04B 3/54* | (2006.01) |
| *H04B 1/00* | (2006.01) |
| *H04M 1/72* | (2006.01) |

(52) U.S. Cl. .................. 380/266; 455/445; 370/475
(58) Field of Classification Search ............. 380/266; 455/445; 370/475
See application file for complete search history.

(56) References Cited

U.S. PATENT DOCUMENTS

| | | |
|---|---|---|
| 1,547,242 A | 7/1925 | Strieby |
| 2,298,435 A | 10/1942 | Tunick .................. 250/15 |
| 2,577,731 A | 12/1951 | Berger .................. 179/2.5 |
| 3,369,078 A | 2/1968 | Stradley .................. 179/2.5 |
| 3,445,814 A | 5/1969 | Spalti .................. 340/151 |
| 3,605,009 A | 9/1971 | Enge .................. 323/93 |
| 3,641,536 A | 2/1972 | Prosprich .................. 340/870.15 |
| 3,656,112 A | 4/1972 | Paull .................. 340/151 |
| 3,696,383 A | 10/1972 | Oishi et al. .................. 340/310 |
| 3,702,460 A | 11/1972 | Blose .................. 340/150 |

(Continued)

FOREIGN PATENT DOCUMENTS

DE 197 28 270 A1 1/1999

(Continued)

OTHER PUBLICATIONS

Jae-Jo Lee, Choong Seon Hong, Joon-Myung Kang, and James Won-Ki Hong, "Power Line Communication Network Trial and Management in Korea", Nov. 2006, International Journal of Network Management, vol. 16, Issue 6, pp. 443-457.*

(Continued)

*Primary Examiner*—Matthew Smithers
*Assistant Examiner*—Courtney D Fields
(74) *Attorney, Agent, or Firm*—Mel Barnes; Capital Legal Group, LLC (57) ABSTRACT

The repeater of the present invention communicates data signals over power lines. The repeater of one embodiment includes at least one modem that receives a data packet and attempts to decrypt the data packet with a first and/or second encryption key. If the packet is successfully decrypted using the first encryption key, the packet is encrypted using the second encryption and transmitted over the power line. If the packet is successfully decrypted using the second encryption key, the packet is encrypted using the first encryption and transmitted over the power line.

50 Claims, 4 Drawing Sheets

U.S. PATENT DOCUMENTS

| | | | |
|---|---|---|---|
| 3,810,096 A | 5/1974 | Kabat et al. ............ 340/147 R |
| 3,846,638 A | 11/1974 | Wetherell ...................... 307/3 |
| 3,895,370 A | 7/1975 | Valentini ................... 340/310 |
| 3,911,415 A | 10/1975 | Whyte ....................... 340/310 |
| 3,942,168 A | 3/1976 | Whyte .................. 340/310.01 |
| 3,942,170 A | 3/1976 | Whyte ....................... 340/310 |
| 3,944,723 A | 3/1976 | Fong |
| 3,962,547 A | 6/1976 | Pattantyus-Abraham . 179/2.5 R |
| 3,964,048 A | 6/1976 | Lusk et al. ............. 340/310 R |
| 3,967,264 A | 6/1976 | Whyte et al. .......... 340/310.08 |
| 3,973,087 A | 8/1976 | Fong ...................... 179/170 R |
| 3,973,240 A | 8/1976 | Fong ........................... 340/151 |
| 3,993,989 A | 11/1976 | Held et al. .............. 340/310 R |
| 4,004,110 A | 1/1977 | Whyte ..................... 179/170 J |
| 4,012,733 A | 3/1977 | Whyte ....................... 340/310 |
| 4,016,429 A | 4/1977 | Vercellotti et al. .......... 307/149 |
| 4,053,876 A | 10/1977 | Taylor .................... 340/253 H |
| 4,057,793 A | 11/1977 | Johnson et al. ......... 340/310 R |
| 4,060,735 A | 11/1977 | Pascucci et al. ................ 307/3 |
| 4,070,572 A | 1/1978 | Summerhayes ............. 250/199 |
| 4,119,948 A | 10/1978 | Ward et al. ............ 340/870.02 |
| 4,142,178 A | 2/1979 | Whyte et al. .............. 340/310 |
| 4,188,619 A | 2/1980 | Perkins .................. 340/310 R |
| 4,239,940 A | 12/1980 | Dorfman .................. 179/2.51 |
| 4,250,489 A | 2/1981 | Dudash et al. |
| 4,254,402 A | 3/1981 | Perkins .................. 340/310 R |
| 4,263,549 A | 4/1981 | Toppeto ...................... 324/127 |
| 4,268,818 A | 5/1981 | Davis et al. ........... 340/870.38 |
| 4,323,882 A | 4/1982 | Gajjer ................... 340/310 R |
| 4,357,598 A | 11/1982 | Melvin, Jr. ............. 340/310 A |
| 4,359,644 A | 11/1982 | Foord .......................... 307/40 |
| 4,367,522 A | 1/1983 | Forstbauer et al. ......... 363/137 |
| 4,383,243 A | 5/1983 | Krügel et al. ........... 340/310 R |
| 4,408,186 A | 10/1983 | Howell .................... 340/310 A |
| 4,409,542 A | 10/1983 | Becker et al. ............. 324/57 Q |
| 4,419,621 A | 12/1983 | Becker et al. ................ 324/51 |
| 4,433,284 A | 2/1984 | Perkins ....................... 323/361 |
| 4,442,492 A | 4/1984 | Karlsson et al. ............. 364/464 |
| 4,457,014 A | 6/1984 | Bloy ............................ 381/98 |
| 4,468,792 A | 8/1984 | Baker et al. .................. 375/45 |
| 4,471,399 A | 9/1984 | Udren ......................... 361/64 |
| 4,473,816 A | 9/1984 | Perkins ...................... 340/310 |
| 4,473,817 A | 9/1984 | Perkins ...................... 340/310 |
| 4,475,209 A | 10/1984 | Udren ............................ 375/4 |
| 4,479,033 A | 10/1984 | Brown et al. .............. 179/2.51 |
| 4,481,501 A | 11/1984 | Perkins ...................... 340/310 |
| 4,495,386 A | 1/1985 | Brown et al. ............... 455/402 |
| 4,517,548 A | 5/1985 | Ise et al. ................. 340/310 R |
| 4,569,045 A | 2/1986 | Schieble et al. .............. 370/85 |
| 4,599,598 A | 7/1986 | Komoda et al. ....... 340/310 A |
| 4,638,298 A | 1/1987 | Spiro |
| 4,642,607 A | 2/1987 | Strom et al. ................ 340/310 |
| 4,644,321 A | 2/1987 | Kennon .................. 340/310 A |
| 4,652,855 A | 3/1987 | Weikel ....................... 340/310 |
| 4,675,648 A | 6/1987 | Roth et al. .............. 340/310.07 |
| 4,683,450 A | 7/1987 | Max et al. .................. 333/202 |
| 4,686,382 A | 8/1987 | Shuey ....................... 307/149 |
| 4,686,641 A | 8/1987 | Evans ....................... 364/580 |
| 4,697,166 A | 9/1987 | Warnagiris et al. ...... 340/310 R |
| 4,701,945 A | 10/1987 | Pedigo ......................... 379/66 |
| 4,724,381 A | 2/1988 | Crimmins ................... 324/127 |
| 4,745,391 A | 5/1988 | Gajjar .................... 340/310 A |
| 4,746,897 A | 5/1988 | Shuey .................... 340/310 R |
| 4,749,992 A | 6/1988 | Fitzmeyer et al. ..... 340/870.02 |
| 4,766,414 A | 8/1988 | Shuey .................... 340/310 A |
| 4,772,870 A | 9/1988 | Reyes .................... 340/310 R |
| 4,785,195 A | 11/1988 | Rochelle et al. .............. 307/18 |
| 4,800,363 A | 1/1989 | Braun et al. ............ 340/310 A |
| 4,835,517 A | 5/1989 | van der Gracht et al. ...................... 340/310 A |
| 4,903,006 A | 2/1990 | Boomgaard ............ 340/310 A |
| 4,904,996 A | 2/1990 | Fernandes ............... 340/870.07 |
| 4,912,553 A | 3/1990 | Pal et al. ...................... 358/86 |
| 4,973,940 A | 11/1990 | Sakai et al. ............. 340/310 R |
| 4,979,183 A | 12/1990 | Cowart ...................... 375/142 |
| 5,006,846 A | 4/1991 | Granville et al. ...... 340/870.28 |
| 5,066,939 A | 11/1991 | Mansfield, Jr. ......... 340/310 R |
| 5,068,890 A | 11/1991 | Nilssen ........................ 379/90 |
| 5,148,144 A | 9/1992 | Sutterlin et al. ........ 340/310 A |
| 5,151,838 A | 9/1992 | Dockery ................. 340/310 R |
| 5,185,591 A | 2/1993 | Shuey .................... 340/310 A |
| 5,191,467 A | 3/1993 | Kapany et al. ............. 359/341 |
| 5,210,519 A | 5/1993 | Moore ....................... 340/310 |
| 5,257,006 A | 10/1993 | Graham et al. ......... 340/310 A |
| 5,301,208 A | 4/1994 | Rhodes ........................ 375/36 |
| 5,319,634 A | 6/1994 | Bartholomew et al. ....... 370/18 |
| 5,351,272 A | 9/1994 | Abraham ..................... 375/38 |
| 5,359,625 A | 10/1994 | Vander Mey et al. ........... 375/1 |
| 5,369,356 A | 11/1994 | Kinney et al. ............... 324/142 |
| 5,375,141 A | 12/1994 | Takahashi ...................... 375/1 |
| 5,406,249 A | 4/1995 | Pettus .................... 340/310.06 |
| 5,410,720 A | 4/1995 | Osterman ................... 725/150 |
| 5,426,360 A | 6/1995 | Maraio et al. .............. 324/126 |
| 5,432,841 A | 7/1995 | Rimer ........................ 455/457 |
| 5,448,229 A | 9/1995 | Lee, Jr. ................. 340/870.02 |
| 5,461,629 A | 10/1995 | Sutterlin et al. ............. 371/30 |
| 5,477,091 A | 12/1995 | Fiorina et al. ................ 307/66 |
| 5,485,040 A | 1/1996 | Sutterlin ........................ 307/3 |
| 5,497,142 A | 3/1996 | Chaffanjon ............ 340/310.06 |
| 5,498,956 A | 3/1996 | Kinney et al. ............... 324/142 |
| 4,749,992 A | 6/1996 | Fitzmeyer et al. ..... 340/870.02 |
| 5,533,054 A | 7/1996 | DeAndrea et al. ........... 375/286 |
| 5,559,377 A | 9/1996 | Abraham ................... 307/104 |
| 5,579,221 A | 11/1996 | Mun .......................... 364/188 |
| 5,579,335 A | 11/1996 | Sutterlin et al. ............. 375/200 |
| 5,592,482 A | 1/1997 | Abraham ....................... 348/8 |
| 5,598,406 A | 1/1997 | Albrecht et al. ............. 370/296 |
| 5,616,969 A | 4/1997 | Morava ........................ 307/91 |
| 5,625,863 A | 4/1997 | Abraham ..................... 455/3.3 |
| 5,630,204 A | 5/1997 | Hylton et al. ................. 455/3.3 |
| 5,640,416 A | 6/1997 | Chalmers .................... 375/147 |
| 5,664,002 A | 9/1997 | Skinner, Sr. ................ 379/56.2 |
| 5,684,450 A | 11/1997 | Brown ................... 340/310.02 |
| 5,691,691 A | 11/1997 | Merwin et al. ........ 340/310.02 |
| 5,694,108 A | 12/1997 | Shuey .................... 340/310.01 |
| 5,705,974 A | 1/1998 | Patel et al. ............. 340/310.08 |
| 5,712,614 A | 1/1998 | Patel et al. ............. 340/310.03 |
| 5,717,685 A | 2/1998 | Abraham ..................... 370/30 |
| 5,726,980 A | 3/1998 | Rickard ....................... 370/293 |
| 5,748,671 A | 5/1998 | Sutterlin et al. ............. 375/206 |
| 5,770,996 A | 6/1998 | Severson et al. ....... 340/310.08 |
| 5,774,526 A | 6/1998 | Propp et al. ................ 379/90.1 |
| 5,777,544 A | 7/1998 | Vander Mey et al. ... 340/310.06 |
| 5,777,545 A | 7/1998 | Patel et al. ............. 341/310.06 |
| 5,777,769 A | 7/1998 | Coutinho .................... 359/173 |
| 5,778,116 A | 7/1998 | Tomich ......................... 385/16 |
| 5,796,607 A | 8/1998 | Le Van Suu .......... 364/140.01 |
| 5,802,102 A | 9/1998 | Davidovici ................. 375/152 |
| 5,805,053 A | 9/1998 | Patel et al. ............. 340/310.01 |
| 5,818,127 A | 10/1998 | Abraham ................... 307/106 |
| 5,818,821 A | 10/1998 | Schurig ....................... 370/293 |
| 5,828,293 A | 10/1998 | Rickard .................. 340/310.04 |
| 5,835,005 A | 11/1998 | Furukawa et al. ..... 340/310.01 |
| 5,847,447 A | 12/1998 | Rozin et al. ................ 257/678 |
| 5,856,776 A | 1/1999 | Armstrong et al. .... 340/310.01 |
| 5,864,284 A | 1/1999 | Sanderson et al. ..... 340/310.01 |
| 5,870,016 A | 2/1999 | Shresthe ................. 340/310.01 |
| 5,880,677 A | 3/1999 | Lestician ................ 340/825.06 |
| 5,881,098 A | 3/1999 | Tzou .......................... 375/152 |
| 5,892,430 A | 4/1999 | Wiesman et al. ...... 340/310.01 |
| 5,929,750 A | 7/1999 | Brown ................... 340/310.02 |
| 5,933,071 A | 8/1999 | Brown ................... 340/310.01 |
| 5,933,073 A | 8/1999 | Shuey .................... 340/310.07 |
| 5,937,003 A | 8/1999 | Sutterlin et al. ............. 375/208 |

| | | | |
|---|---|---|---|
| 5,937,342 A | 8/1999 | Kline | 455/402 |
| 5,949,327 A | 9/1999 | Brown | 340/310.01 |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.01 |
| 5,994,998 A | 11/1999 | Fisher et al. | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,040,759 A | 3/2000 | Sanderson | 340/310.01 |
| 6,091,932 A | 7/2000 | Langlais | 455/5.1 |
| 6,104,707 A | 8/2000 | Abraham | 370/295 |
| 6,140,911 A | 10/2000 | Fisher et al. | 340/310.01 |
| 6,144,292 A | 11/2000 | Brown | 340/310.02 |
| 6,151,330 A | 11/2000 | Liberman | 370/449 |
| 6,157,292 A | 12/2000 | Piercy et al. | 340/310.01 |
| 6,172,597 B1 | 1/2001 | Brown | 340/310.02 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,239,722 B1 | 5/2001 | Colton et al. | 340/870.02 |
| 6,282,405 B1 | 8/2001 | Brown | 725/79 |
| 6,297,729 B1 | 10/2001 | Abali et al. | 340/310.01 |
| 6,297,730 B1 | 10/2001 | Dickinson | 340/310.01 |
| 6,317,031 B1 | 11/2001 | Rickard | 340/310.03 |
| 6,331,814 B1 | 12/2001 | Albano et al. | 340/310.01 |
| 6,346,875 B1 | 2/2002 | Puckette et al. | |
| 6,373,376 B1 | 4/2002 | Adams et al. | 340/310.01 |
| 6,373,377 B1 | 4/2002 | Sacca et al. | |
| 6,396,391 B1 | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,425,852 B1 | 7/2002 | Epstein et al. | 600/13 |
| 6,441,723 B1 | 8/2002 | Mansfield, Jr. et al. | 340/310.01 |
| 6,452,482 B1 | 9/2002 | Cern | 340/310.01 |
| 6,480,510 B1 | 11/2002 | Binder | 370/502 |
| 6,486,747 B1 | 11/2002 | DeCramer et al. | 333/25 |
| 6,496,104 B2 | 12/2002 | Kline | 340/310.01 |
| 6,504,357 B1 | 1/2003 | Hemminger et al. | 340/310.01 |
| 6,624,532 B1 | 9/2003 | Davidow | |
| 6,687,574 B2 | 2/2004 | Pietrowicz et al. | |
| 6,885,674 B2 | 4/2005 | Hunt et al. | |
| 6,965,303 B2 | 11/2005 | Mollenkopf | |
| 6,977,578 B2 | 12/2005 | Kline | |
| 6,980,091 B2 | 12/2005 | White et al. | |
| 6,993,317 B2 | 1/2006 | Belsak, Jr. | |
| 6,998,962 B2 | 2/2006 | Cope et al. | |
| 2001/0038329 A1 | 11/2001 | Diamanti et al. | 340/310.01 |
| 2001/0038343 A1 | 11/2001 | Meyer et al. | 340/870.02 |
| 2001/0052843 A1 | 12/2001 | Wiesman et al. | 340/310.01 |
| 2001/0054953 A1 | 12/2001 | Kline | 340/310.01 |
| 2002/0010870 A1 | 1/2002 | Gardner | 713/300 |
| 2002/0014884 A1 | 2/2002 | Chung | 324/74 |
| 2002/0027496 A1 | 3/2002 | Cern | 340/310.01 |
| 2002/0041228 A1 | 4/2002 | Zhang | 340/310.01 |
| 2002/0060624 A1 | 5/2002 | Zhang | 340/310.01 |
| 2002/0071452 A1 | 6/2002 | Abraham | 370/480 |
| 2002/0080010 A1 | 6/2002 | Zhang | 340/310.06 |
| 2002/0095662 A1 | 7/2002 | Ashlock et al. | 717/136 |
| 2002/0098867 A1 | 7/2002 | Meiksen et al. | 455/560 |
| 2002/0105413 A1 | 8/2002 | Cern | 340/310.01 |
| 2002/0109585 A1 | 8/2002 | Sanderson | |
| 2002/0140547 A1 | 10/2002 | Litwin, Jr. et al. | 340/310.01 |
| 2002/0171535 A1 | 11/2002 | Cern | 340/310.07 |
| 2003/0062990 A1 | 4/2003 | Schaeffer, Jr. et al. | 340/310.01 |
| 2003/0067910 A1 | 4/2003 | Razazian et al. | 370/352 |
| 2003/0160684 A1 | 8/2003 | Cern | 340/310.01 |
| 2003/0224784 A1 | 12/2003 | Hunt et al. | |
| 2004/0067745 A1 | 4/2004 | Belsak | |
| 2004/0090312 A1 | 5/2004 | Manis et al. | |
| 2004/0110483 A1 | 6/2004 | Mollenkopf | |
| 2004/0135676 A1 | 7/2004 | Berkman et al. | |
| 2004/0157551 A1 | 8/2004 | Gainey et al. | |
| 2004/0163128 A1 | 8/2004 | Phillips et al. | |
| 2004/0168199 A1 | 8/2004 | Phillips et al. | |
| 2005/0068223 A1 | 3/2005 | Vavik | |
| 2005/0168326 A1 | 8/2005 | White et al. | |
| 2005/0200459 A1* | 9/2005 | White | 340/310.01 |
| 2005/0220004 A1 | 10/2005 | Vollmer et al. | |
| 2005/0285720 A1 | 12/2005 | Cope et al. | |
| 2006/0073805 A1 | 4/2006 | Zumkeller et al. | |
| 2006/0079198 A1 | 4/2006 | Sanderson | |

FOREIGN PATENT DOCUMENTS

| | | |
|---|---|---|
| EP | 0 141 673 A2 | 5/1985 |
| EP | 0 581 351 A1 | 2/1994 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 0 916 194 B1 | 9/2001 |
| EP | 1 011 235 A3 | 5/2002 |
| EP | 1 014 640 A3 | 7/2002 |
| EP | 1 021 866 B1 | 10/2002 |
| EP | 1 251 646 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| JP | 10200544 A2 | 7/1998 |
| JP | 2007074426 A * | 3/2007 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 00/59076 A1 | 10/2000 |
| WO | 00/60701 A1 | 10/2000 |
| WO | 01/08321 A1 | 2/2001 |
| WO | 01/43305 A1 | 6/2001 |
| WO | 01/82497 A1 | 11/2001 |
| WO | 02/054605 A1 | 7/2002 |
| WO | WO-03/030396 A2 | 4/2003 |

OTHER PUBLICATIONS

"EMETCON Automated Distribution System: Communications Guide", *Westinghouse ABB Power T & D Company Technical Manual 42-6001A.*, (Sep. 1989), 1-55.
U.S. Appl. No. 09/765,910, filed Jan. 19, 2001, Kline.
U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912.633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.

U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/176,500, filed Jun. 21, 2002, Pridmore, Jr. et al.
U.S. Appl. NO. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/625,280, filed Jul. 23, 2003, Corcoran.
U.S. Appl. No. 10/319,317, filed Dec. 13, 2002, Mollenkopf et al .
U.S. Appl. No. 10/348,164, filed Jan. 21, 2003, Cope et al.
U.S. Appl. No. 10/385,899, filed Mar. 3, 2003, Mollenkopf.
U.S. Appl. No. 10/436,778, filed May 13, 2003, Giannini et al.
Patent Abstracts of Japan, Japanese Publication No. 10200544 A2, published Jul. 31, 1998, (Matsushita Electric Works, LTD).
Tohoku Electric Power, Co., Inc., "Tohoku Electric Develops High-Speed Communications Systems Using Power Distribution Lines,"*Tohoku Currents*, Spring 1998, 8(1), 2 pages (http://www.tohoku-epco.co.jp/profil/kurozu/c_vol8_1/art04.htm).
Power Line Communications Conference entitled, "PLC, A New Competitor in Broadband Internet Access," Dec. 11-12, 2001, Washington, D.C., 60 pages.
Rivkin, S. R., "Co-Evolution of Electric & Telecommunications Networks," *The Electricity Journal*, May 1998, 71-76.
Marketing Assessment Presentation entitled "Powerline Telecommunications," The Shpigler Group for CITI PLT, Jul. 16, 2002, 9 pages.
Campbell, C., presentation entitled "Building a Business Case for PLC: Lessons Learned From the Communicaiton Industry Trenches," KPMG Consulting, Jul. 16, 2002, 5 pages.
"Embedded Power Line Carrier Modem," Archnet Electronic Technology, http://www.archnetco.com/english/product/ATL90.htm, 2001, 3 pages.
"Archnet: Automatic Meter Reading System Power Line Carrier Communication", www.archnetco.com/english/product/product_sl.htm, 3 pages.
"Power Line Communications Solutions", www.echelon.com/products/oem/transceivers/powerline/default.htm, 2 pages.
"Texas Instruments: System Block Diagrams; Power Line Communication (Generic)", http://focus.ti.com/docs/apps/catalog/resources/blockdiagram.jhtml?bdId=638, 1 page.
Feduschak, N.A., "Waiting in the Wings: Is Powerline Technology Ready to Compete with Cable?", Mar. 2001, www.cabletoday.com/ic2/archives/0301/0301powerline.htm, 5 pages.
"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62, 1-11.
"Intellon Corporation Test Summary for Transformerless Coupler Study", *Intellon No News Wires*, Dec. 24, 1998, DOT/NHTSA Order No. DTNH22-98-P-07632, pp. 1-18.
EMETCON *Automated Distribution System*, ABB Power T & D Company, Inc., Jan. 1990, Raleigh, North Carolina, No. B-919A, 14 pages.
"Dedicated Passive Backbone for Power Line Communications", *IBM Technical Disclosure Bulletin*, Jul. 1997, 40(7), 183-185.
Coaxial Feeder Cables [Engineering Notes], *PYE Telecommunications Limited Publication Ref No. TSP50711*, Jun. 1975, Cambridge, England, 15 pages.
"Centralized Commercial Building Applications with the Lonworks® PLT-21 Power Line Transceiver", *Lonworks Engineering Bulletin*, Echelon, Apr. 1997, pp. 1-22.
"Plexecon Logistics, Inc., Power Line Communications", www.plexecon.com/power.html, 2 pages.
"EMETCON Automated Distribution System: Communications Guide", *Westinghouse ABB Power T & D Company Technical Manual 42-6001A*, Sep. 1989, 55 pages.
Abraham, K.C. et al., "A Novel High-Speed PLC Communication Modem", *IEEE Transactions on Power Delivery*, 1992, 7(4), 1760-1768.
J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, vol. II-Communication, Control, Devices and Systems, John Wiley & Sons, 617-627.
Chen, Y-F. et al. "Baseband Transceiver Design of a 128-Kbps Power-Line Modem for Household Applications", *IEEE Transactions on Power Dellivery*, 2002, 17(2), 338-344.
Coakley, N.G. et al., "Real-Time Control of a Servosytem Using the Inverter-Fed Power Lines to Communicate Sensor Feedback", *IEEE Transactions on Industrial Electronics*, 1999, 46(2), 360-369.
Esmailian, T. et al., "A Discrete Multitone Power Line Communication System", *Department of Electrical and Computer Engineering*, University of Toronto, Ontario Canada, 2000 IEEE, pp. 2953-2956.
Kawamura, A. et al., "Autonomous Decentralized Manufacturing System Using High-speed Network with Inductive Transmission of Data and Power", *IEEE*, 1996, 940-945.
Kilbourne, B. "EEI Electric Perspectives: The Final Connection", www.eei.org/ep/editorial/Jul-01/0701conenct.htm, 7 pages.
Kim, W-O., et al., "A Control Network Architecture Based on EIA-709. 1 Protocol for Power Line Data Communications", *IEEE Transactions on Consumer Electronics*, 2002, 48(3), 650-655.
Lim, C.K. et al., "Development of a Test Bed for High-Speed Power Line Communications", School of Electrical and Electronic Engineering, Nanyang Technological University, Singapore, *IEEE*, 2000, 451-456.
Lokken, G. et al., "The Proposed Wisconsin electronic Power Company Load Management System Using Power Line Carrier Over Distribution Lines", *1976 National Telecommunications Conference, IEEE*, 1976, 2.2-12.2-3.
Marthe, E. et al., "Indoor Radiated Emission Associated with Power Line Communication Systems", *Swiss Federal Institute of Technology Power Systems Laboratory IEEE*, 2001, 517-520.
Naredo, J.L. et al., "Design of Power Line Carrier Systems on Multitransposed Delta Transmission Lines", *IEEE Transactions on Power Delivery*, 1991, 6(3), 952-958.
Nichols, K., "Build a Pair of Line-Carrier Modems", *CRC Electronics-Radio Electronics*, 1988, 87-91.
Okazaki, H, et al., "A Transmitting, and Receiving Method for CDMA Communications Over Indoor Electrical Power Lines", *IEEE*, 1998, pp. VI-522-VI-528.
B. Don Russell, "Communication Alternatives for Distribution Metering and Load Management", *IEEE Transactions on Power Apparatus and Systems*, 1980, vol. PAS-99(4), pp. 1448-1455.
Sado, WN. et al., "Personal Communication on Residential Power Lines- Assessment of Channel Parameters", *IEEE*, 532-537.
Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.
De Wilde, W. R. et al., "Upwards to a Reliable Bi-Directional Communication Link on the LV Power Supplies for Utility Services: Field Tests in Belgium," pp. 168-172.
Tanaka, M., "Transmission Characteristics of a Power Line Used for Data Communications at High Frequencies," IEEE Transactions on Consumer Electronics, Feb. 1989, vol. 35, No. 1, pp. 37-42.
Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.
IEEE Guide for Power-Line Carrier Applicaitons, ANSI/IEEE Std 643-1980, © 1980 by The Institute of Electrical and Electronics Engineers, Inc., pp. 1-80.
Hatori, M. et al., "Home Informatization and Standardization of Home Bus," IEEE Transacitons on Consumer Electronics, Aug. 1986, vol. CE-32, No. 3, pp. 542-549.
Hunt, J. M. et al., "Electrical Energy Monitoring and Control System for the Home," IEEE Transactions on Consumer Electronics, Aug. 1986, vol. CE-32, No. 3, pp. 578-583.
Gutzwiller, F. W. et al., "Homenet: A Control Network for Consumer Applications," IEEE Transacitons on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunicaitons Above 1 Mhz," © 1998 IEEE, pp. 2870-2875.

Onunga, J. et al., "Distribution Line Communicaitons U sing CSMA Access Control with Priority Acknowledgements," IEEE Transactions on Power Delilvery, Apr. 1989, vol. 4, No. 2, pp. 8778-886.

Tanaka, M., "High Frequency Noise Power Spectrum, Impedance and Transmission Loss of Power Line in Japan on Intrabuilding Power Line Communicaitons," IEEE Transactions on Consumer Electronics, May 1988, vol. 34, No. 2, pp. 321-326.

Meng, H. et al., "A Transmission Line Model for High-Frequency Power Line Communication Channel," © 2002 IEEE, pp. 1290-1295.

Burrascano, P. et al., "Performance Evaluation of Digital Signal Transmission Channels on Coronating Power Lines," © 1988 IEEE, pp. 365-368.

DiClementi, D. A. et al., "Electrical Distribution System Power Line Characterization," © 1996 IEEE, pp. 271-276.

Abraham, K. C. et al., "A Novel High-Speed PLC Communication Modem," IEEE Transacitons on Power Delivery, Oct. 1992, vol. 7, No. 4, pp. 1760-1768.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

LONWORKS Engineering Bulletin, "Demand Side Management with LONWORKS® Power Line Transceivers," Dec. 1996, 36 pages.

LONWORKS Engineering Bulletin, "Centralized Commercial Building Applicaitons with the LONWORKS® PLT-21 Power Line Transceiver," Apr. 1997, 22 pages.

HomePlug™ Powerline Alliance, HomePlug Initial Draft Medium Interface Specification, May 19, 2000, 109 pages.

HomePlug™ Powerline Alliance, HomePlug 0.5 Draft Medium Interface Specification, Nov. 28, 2000, 133 pages.

HomePlug™ Powerline Alliance, HomePlug Initial Draft Medium Interface Specification, Jul. 27, 2000, 109 pages.

HomePlug™ Powerline Allliance, HomePlug 1.01 Specification, Dec. 1, 2001, 139 pages.

International Search Report dated May 2, 2001, from PCt/US01/01810.

International Search dated Jul. 16, 2001, from PCT/US01/12699.

International Search Report dated Oct. 22, 2001, from PCt/US01/12291.

International Search Report dated Jun. 5, 2002, from PCt/US01/48064.

Written Opinion dated May 15, 2002, from PCT/US01/12699.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

Written Opinion dated Aug. 20, 2003, from PCT/US02/04310.

* cited by examiner

POWER LINE COMMUNICATION DEVICE AND METHOD OF USING THE SAME

FIELD OF THE INVENTION

The present invention relates, generally, to power line communication devices and in particular, to a communication device for repeating data signals on power lines.

BACKGROUND OF THE INVENTION

Well-established power distribution systems exist throughout most of the United States, and other countries, that provide power to customers via power lines. With some modification, the infrastructure of the existing power distribution systems can be used to provide data communication in addition to power delivery, thereby forming a power line communication system (PLCS). In other words, existing power lines that already have been run to many homes and offices can be used to carry data signals to and from the homes and offices. These data signals are communicated on and off the power lines at various points in the power distribution communication system, such as, for example, near homes, offices, Internet service providers, and the like.

While the concept may sound simple, there are many challenges to overcome in order to use power lines for data communication. Power distribution systems include numerous sections, which transmit power at different voltages. The transition from one section to another typically is accomplished with a transformer. The sections of the power line distribution system that are connected to the customers typically are low voltage (LV) sections having a voltage between 100 volts and 240 volts, depending on the system. In the United States, the low voltage section typically is about 120 volts (120V). The sections of the power distribution system that provide the power to the low voltage sections are referred to as the medium voltage (MV) sections. The voltage of the MV section is in the range of 1,000 Volts to 100,000 volts and typically 8.66 kilo volts (kV) to neutral (15 kV between phase conductors). The transition from the MV section to the LV section of the power distribution system typically is accomplished with a distribution transformer, which converts the higher voltage of the MV section to the lower voltage of the LV section.

Power system transformers are one obstacle to using MV or LV power distribution lines for data communication. Transformers designed for conversion of voltages at power frequencies (i.e. 50 or 60 Hz) present complex and often undesirable series and shunt impedances that can be detrimental to data signal frequencies useful for data communication. As such, power distribution communication systems face the challenge of passing the data signals around (or sometimes through) the distribution transformers.

Many power lines, including both LV (external and the internal customer premise power line wiring) and MV power lines, provide a high impedance communication channel for high frequency data signals thereby significantly attenuating data signals. In addition, power lines may provide a very noisy communication channel and such noise is often sporadic and unpredictable. Thus, due to the limited power that may be used to transmit data signals on power lines (for example, due to Federal Communication Commission (FCC) regulations regarding RF emissions), high frequency data signals will only propagate a finite distance that in some instances may not be far enough from the transmitting source to be reliably received by the intended communication device.

Thus, there is a need for a power line communication device to extend the range of communications of a power line communication (PLC) device. Such a device should be designed to facilitate bi-directional communication. In addition, the device (or repeater as sometimes referred to herein) should enable the transmission and reception of broadband radio frequency (RF) signals used for data transmission over high voltage (HV), MV and LV power lines, including the internal customer premise wiring. Finally, it is desirable to design such a repeater to be installed without the need to disconnect power from the power lines.

SUMMARY OF THE INVENTION

The device of the present invention communicates data signals over power lines. The repeater of one embodiment comprises at least one modem that receives a data packet and attempts to decrypt the data packet with a first and/or second encryption key. If the packet is successfully decrypted using the first encryption key, the packet is encrypted using the second encryption and transmitted over the power line. If the packet is successfully decrypted using the second encryption key, the packet is encrypted using the first encryption and transmitted over the power line. The use of multiple encryption keys creates multiple logical networks.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

I. System Architecture and General Design Concepts

The repeater of the present invention may be used to communicate data over LV, MV, or HV power lines and to communicate with any PLC device such as a transformer bypass device, a backhaul point, another repeater, a power line modem or any other device communicatively coupled to the power line. The present invention may be used to communicate data signals over both underground and overhead power lines. In addition, the present invention also may be communicatively coupled to LV power lines inside the customer premises (e.g., at a wall socket) (an indoor repeater) or external to the customer premises (an outdoor repeater). The outdoor repeater may be installed on the exterior of, or adjacent to, the customer premises or may be installed near, or adjacent to, the distribution transformer serving the customer premises (e.g., on a utility pole or inside a transformer enclosure). As will be discussed in detail below, the repeater may provide communications for a plurality of user devices that may located in different (or the same) customer premises.

Figure 1A:
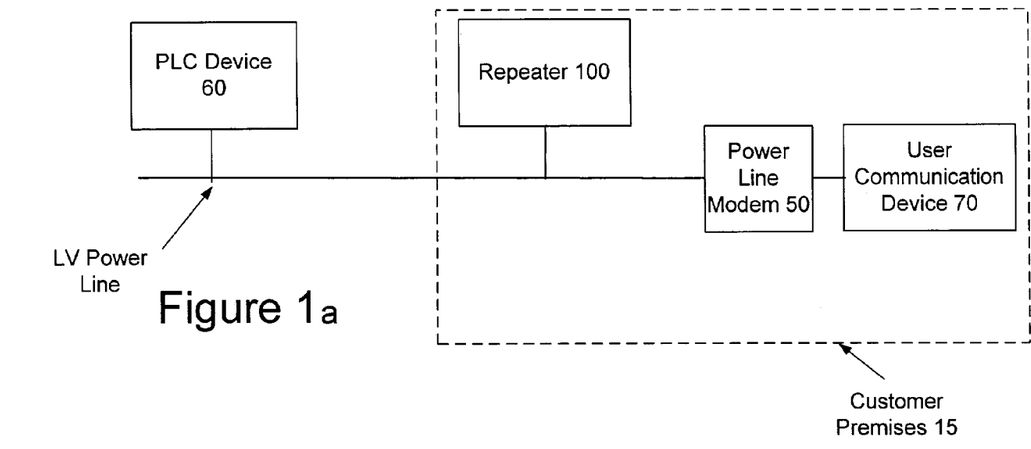
FIG. 1a is a schematic of an example PLCS employing an example embodiment of a communication device according to the present invention.

FIG. 1a is a schematic of an example embodiment of a PLC system employing a repeater 100 according to the invention that is designed to repeat data signals over the LV power lines. The repeater 100 in this topology is positioned inside the customer premises and may be plugged into a wall socket that preferably, although not necessarily, is near the breaker box so that the repeater 100 is near the location at which the LV power line enters the customer premises and where the data signals are strong enough to be reliably received by the repeater 100. Alternately, the repeater 100 may be communicatively coupled to the LV power line at the breaker box (e.g., inside the box) or coupled to the external LV power lines on the outside of the customer premises.

As shown in FIG. 1a, the topology includes a user communication device 70 connected to a power line modem 50. The user communication device 70 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, a home security system, or other device.

The user communication device 70 is communicatively coupled to the power line modem 50 (sometimes known as a power line interface device), which is well-known in the art. In some instances, the power line modem 50 may be integral to the user device. The power line modem 50 serves as an interface for user devices to access the PLC system. The power line modem 50 can have a variety of interfaces for user communication devices data. For example, a power line modem 50 can include a RJ-11 Plain Old Telephone Service (POTS) connector, an RS-232 connector, a USB connector, a 10 Base-T connector, RJ-45 connector, coaxial connector, optical fiber connector, and the like. In this manner, a customer can connect a variety of user devices to the PLCS. Further, multiple power line modems can be plugged into power outlets throughout the customer premises 15, with each power line modem 50 communicating over the same wiring internal to the customer premises 15.

Data received by the repeater 100 from the PLC device 60, which as discussed above may be a transformer bypass device, another repeater 100, a communication interface device, or other device, may be repeated for reception by the power line modem 50 and subsequent reception by the user communication device 70. Data received by the repeater from the power line modem 50 (e.g., originating form the user communication device 70) may be repeated for reception by the PLC device 60.

Figure 1B:
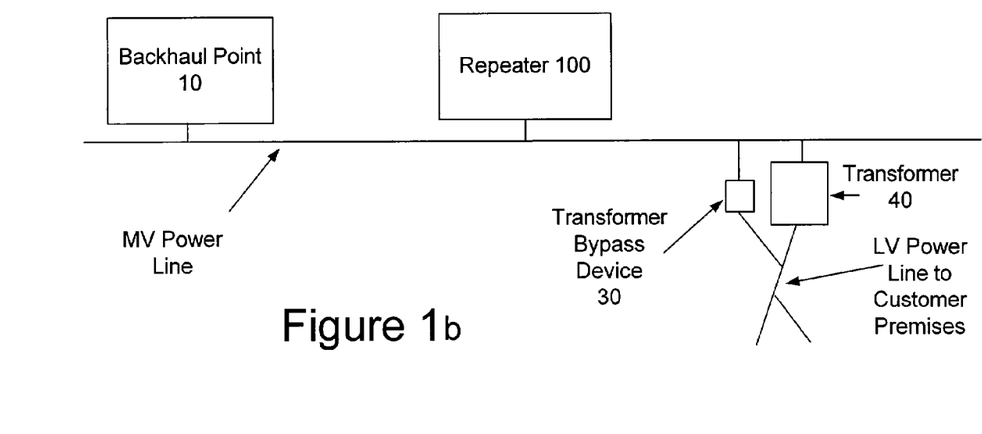
FIG. 1b is a schematic of another example PLCS employing an example embodiment of a communication device according to the present invention.

FIG. 1b is a schematic of another example PLCS employing the invention. In this embodiment, the repeater 100 is communicatively coupled to the MV power line and provides bidirectional communications between a backhaul point 10 and a transformer bypass device 30. It will be evident to those skilled in the art that various embodiments of the present invention may be used to provide communications between any two or more PLC devices.

Figure 2:
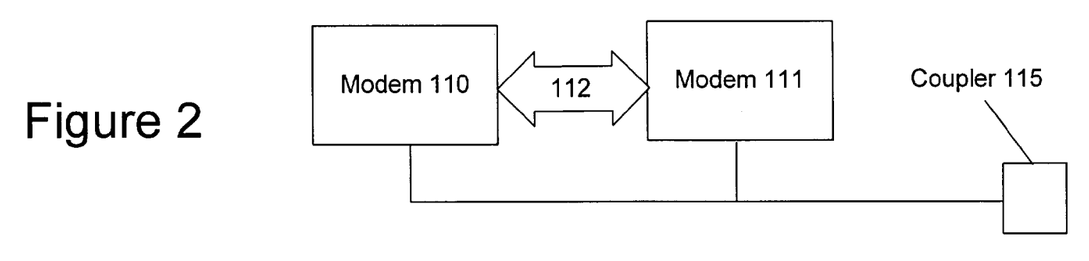
FIG. 2 is a schematic of an example embodiment of a communication device according to the present invention.

FIG. 2 illustrates an example embodiment of the present invention, which is comprised of a first modem 110 and a second modem 111 that are communicatively coupled to each other via communication path 112, which may be an Ethernet bus or other form of communication interface. In addition, both modems 110 and 111 are communicatively coupled to the power line via coupler 115. In this embodiment, coupler 115 may be a conventional three prong wall plug. Although not shown in FIG. 2, this embodiment also includes a power supply that receives power from the LV power line to which the repeater 100 is coupled (and through which the repeater 100 provides communications) and supplies power to the modems.

The modems 110 and 111 may include a modulator, demodulator, an encryption module and a decryption module. In addition, the modems also may include one or more additional functional submodules such as an amplifier, one or more filters, an Analog-to-Digital Converter (ADC), Digital-to-Analog Converter (DAC), a memory, source encoder/decoder, an error encoder/decoder, a channel encoder/decoder, a MAC (Media Access Control) processor. These additional functional submodules may be omitted in some embodiments, may be integrated into a modem integrated circuit (chip or chip set), or may be peripheral to a modem chip. In the present example embodiment, the modems 110 and 111 are formed, at least in part, by part number INT51X1, which is an integrated power line transceiver circuit incorporating most of the above-identified submodules, and which is manufactured by Intellon, Inc. of Ocala, Fla.

The incoming power line data signal from the coupler 115 is supplied to each modem where the RF data signal is extracted from the power signal (e.g., by a high pass filter) and supplied to the ADC of each modem, which converts the incoming RF analog signal to a digital signal. The digital signal is then demodulated. Each modem may then attempt to decrypt the packet. After the decryption algorithm is executed, the modem will perform a validation procedure.

Validation procedures are well known in the art and used to determine the validity of the decrypted packet and may be comprised of a cyclic redundancy check (CRC), a check sum validation, or any other such procedure.

If the validation procedure fails, the packet is discarded (ignored). If the validation procedure passes, the modem may provide source decoding, error decoding, channel decoding, and/or MAC processing, if appropriate, all of which are known in the art and, therefore, not explained in detail here.

In this example embodiment of the invention, the first modem 110 is assigned a first encryption key and the second modem 111 is assigned a second encryption key that is different from the first encryption key. The encryption key is stored in the memory of the modem and used to encrypt and decrypt power line data signals.

Packets transmitted over the LV power line by and to the PLC device 60 are encrypted (and decrypted) using the first encryption key. Packets transmitted by and to the power line modem 50 are encrypted (and decrypted) using the second encryption key.

During operation, the PLC device 60, which may be a transformer bypass device, a backhaul point, another repeater 100, a communication interface device (as described below), or other device, may receive the data packet (e.g., from a remote source), encrypt the data packet using the first encryption key, and transmit the data packet on the power line (which may include error coding, channel coding, modulating the packet, converting the digital signal to analog, and other process steps associated with transmitting). Modem 110 and modem 111 receive the data packet, demodulate the data packet and attempt to decrypt the packet. However, only the first modem 110 successfully decrypts the data packet because the first modem 110 has the correct encryption key for decrypting the packet. Consequently, the validation procedure of the first modem 110 passes and the validation procedure of the second modem 111 fails (because the second modem does not have the correct key for decryption). The second modem therefore discards the packet.

The first modem performs the additional processing of the packet as is necessary, which may comprise source decoding, error decoding, channel decoding, and/or MAC processing. The packet is then transmitted via data path 112 to the second modem 111. The second modem may provide MAC processing channel encoding, source encoding, error encoding, and encryption. The encryption by the second modem 111 is performed using the second encryption key. The data is then modulated and provided to the DAC to convert the digital data to an analog signal for transmission through the coupler 115 onto the power line.

Both the PLC device 60 and the power line modem 50 may receive the packet transmitted by the repeater 100. In addition, the first modem 110 may receive the packet as well. However, the decryption of the data packet by PLC device 60 (and first modem 110) will result in a packet that fails to pass the validation procedure because the packet has been encrypted using the second encryption key (while the PLC device and first modem 110 use the first encryption key to decrypt the packet). The power line modem 50 will successfully decrypt the packet and, therefore, may pass the data to the user communication device.

Transmissions from the power line modem 50 will likewise be decrypted by the second modem 111 (using the second encryption key) and not by the first modem 110. The second modem 111 will transmit the decrypted data packet to the first modem 110, which will encrypt the data packet using the first encryption key, and subsequently transmit the data packet over the power line. The transmitted data packet may be received by the PLC device 60, the power line modem 50, and perhaps the second modem 111. The power line modem 50 (and second modem 111) will attempt to decrypt the packet using the second encryption key and fail the validation procedure. The PLC device 60 will successfully decrypt the packet and, if appropriate, transmit the packet through the PLC network or other network.

This embodiment of the invention may receive and repeat every data packet that the device successfully decrypts. Alternately, the invention may be configured to repeat only select data packets such as those successfully decrypted and having the correct MAC address (or IP address). Thus, different repeaters in different customer premises may use the same set of encryption keys, but have different MAC addresses (or IP addresses) so that the repeater having the MAC address (or IP address) that corresponds to the destination address of the packet is the only repeater that repeats the data packet. Each modem may have its own MAC address (and/or IP address stored in memory).

As shown in FIG. 1b, another example embodiment of the repeater 100 for communicating over MV power lines may provide communications between a backhaul point 10 and a transformer bypass device 30. Thus, the backhaul point 10 and first modem 110 may encrypt and decrypt using a first encryption key. Similarly, the transformer bypass device 30 and second modem 111 may encrypt and decrypt using a second encryption key. The process steps for this embodiment would be similar to those described above with respect to FIG. 1a and therefore, are not repeated here.

The embodiments of the present invention coupled to the MV power line (such as in FIG. 1b) may use a coupler and signal conditioning circuitry described in U.S. patent application Ser. No. 10/348,164, now U.S. Pat. No. 7,046,124, entitled "Power Line Coupling Device and Method of Using the Same" filed Jan. 21, 2003 and U.S. Pat. No. 6,980,090 entitled "Device and Method for Coupling with Electrical Distribution Network Infrastructure to Provide Communications" filed Mar. 10, 2003, which are hereby incorporated by reference. These incorporated applications also describe PLC devices, including some with wireless and power line communication capabilities such as a communication interface device, for which the present invention may provide communications.

Figure 3:
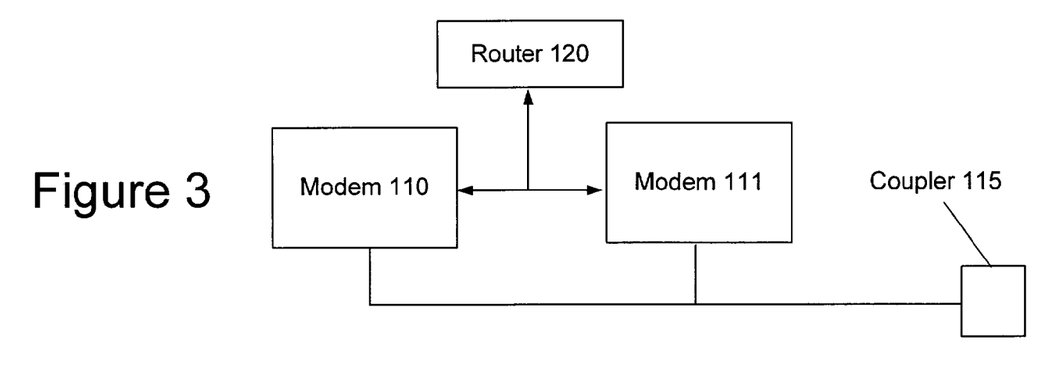
FIG. 3 is a schematic of another example embodiment of a communication device according to the present invention.

Another embodiment of the present invention shown in FIG. 3 further includes a router 120 for controlling the flow of data packets through the repeater 100. As shown in the figure, the router 120 is in communication with the first modem 110 and the second modem 111. The router 120 may perform prioritization, filtering, packet routing, access control, and encryption. The router 120 of this example embodiment of the present invention uses a table (e.g., a routing or bridging table) and programmed routing rules stored in memory to determine the next destination of a data packet. The table is a collection of information and may include information relating to which modem (e.g., modem 110 or 111) leads to particular groups of addresses (such as the addresses of the user devices connected to the customer LV power lines), the transformer bypass device, a backhaul point, another repeater, as well as the priorities for connections to be used, and rules for handling both routine and special cases of traffic (such as voice packets and/or control packets). Thus, in some embodiments information in the table may be used to determine which encryption key should be used to encrypt (or decrypt) a data packet.

The router 120 will detect routing information, such as the destination address (e.g., the destination IP address) and/or other packet information (such as information identifying the packet as voice data), and match that routing information with rules (e.g., address rules) in the table. Depending on the architecture of the device, the rules may used to determine that packets in a particular group of addresses should be processed in a particular manner such as transmitted in a specific direction such as through the second modem 111 (e.g., if the packet has a destination IP address that corresponds to a user device connected to the LV power line), be encrypted with a particular encryption key, and/or be ignored (e.g., if the address does not correspond to a user device connected to the LV power line).

As an example, the table may include information such as the IP addresses (and potentially the MAC addresses) of the user devices on the repeater's LV subnet, and/or the MAC addresses of the power line modems 50 on the repeater's LV subnet. Alternatively, in the case in which the repeater is a MV repeater, the table may include information of the MV subnet mask (which may include the MAC address and/or IP address of the device's backhaul point 10 and one or more transformer bypass devices). Based on the destination address of the packet (e.g., an IP address), the router may pass the packet to the first modem 110, the second modem 111, or ignore the packet. Alternatively, if the IP destination address of the packet matches the IP address of the repeater 100, the repeater 100 may process the packet as a request for data or other command. Thus, the repeater 100 may be designed for receiving and processing the commands described in the patent applications incorporated above, which may be transmitted by a power line server having a network element manager.

The router 120 may also prioritize transmission of packets. For example, data packets determined to be voice packets may be given higher priority for transmission through the repeater 100 than other data packets so as to reduce delays and improve the voice connection experienced by the user. Routing and/or prioritization also may be based on IP addresses, MAC addresses, subscription level, or a combination thereof (e.g., the MAC address of the power line modem or IP address of the user device).

In addition, the router 120 (or in the memory accessed by a separate processor communicating with the router 120) may include a dynamic host configuration protocol (DHCP) server. When a user installs a new user device (and power line modem) on the LV subnet attached to the repeater 100, the user device may need to be provisioned to identify itself on the network. To do so in this embodiment, the new user device transmits a DHCP request, which is received and routed by the repeater to the DHCP server. In response to the request, the repeater 100 may respond by transmitting to the user device the IP address and subnet mask for the user device, the gateway IP address for the device's network interface to be used as the network gateway (e.g., the IP address of the modem 111 of the repeater 100), and the IP addresses of the Domain Name Servers (DNS) all of which may be stored in memory by the user device. In addition, the repeater may transmit a "new user device" alert to a power line server (PLS) communicatively coupled to the PLSC.

Likewise, when first installed on the network, the repeater 100 may transmit a DHCP request, which is received and routed by a PLC device on the PLC network and routed to a DHCP server. In response to the request, the DHCP server may respond by transmitting to the repeater 100 the IP address and subnet mask for the repeater 100, and the gateway IP address for the repeater's network interface to be used as the network gateway (e.g., the IP address of the PLC device) all of which are stored in memory by the repeater. In addition, the PLC device may transmit a "new device" alert to the PLS.

In addition, the router 120 may include a module for performing network address translation (NAT). The router 120 may be configured to translate the destination address (e.g., an IP address) of a packet received from the PLC network side of the network to the address of the user device (or power line modem) on the customer premises side. If there is more than one user device, the translation may require additional information in the packet—such as information identifying a port—to allow the router 120 to determine the IP address corresponding to the user device that should replace the existing destination address in the packet. Similarly, the router may be configured to translate the destination of a packet received from the user device that is intended for the network.

Other embodiments of the invention may include a single modem that is programmed to attempt to decrypt each data packet using a first encryption key. If the decryption is successful, the modem may then encrypt the data packet using a second encryption key and subsequently transmit the encrypted packet over the power line. If the decryption with the first encryption key is not successful, the modem may then attempt to decrypt the received packet using a second encryption key. If the decryption using the second encryption key is successful, the modem may then encrypt the data packet using the first encryption key and subsequently transmit the encrypted packet over the power lines. If neither decryption is successful, the packet may be ignored.

Thus, the use of multiple encryption keys permits the creation of multiple logical networks. While these embodiments include two encryption keys, other embodiments may use three, four, or more encryption keys to create, and for use with, three, four, or more logical networks.

Figure 4:
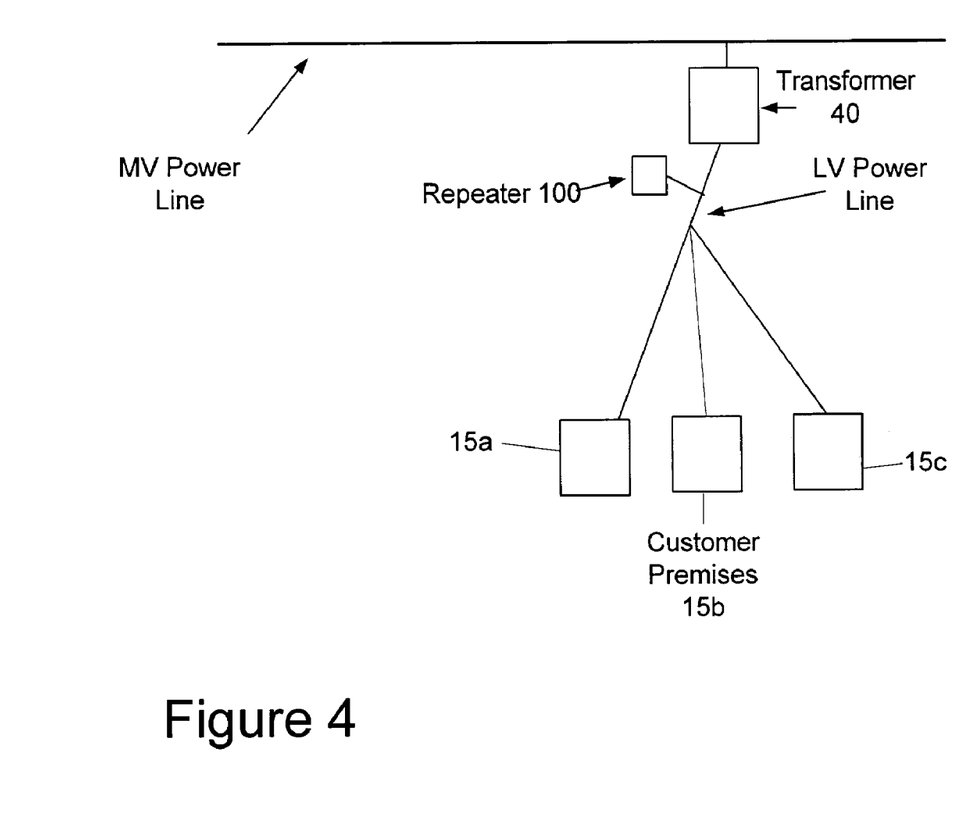
FIG. 4 is a schematic of another example embodiment PLCS employing an example embodiment of a communication device according to the present invention.

Such an embodiment, which is shown in FIG. 4, may be useful when the repeater 100 is communicatively coupled to the LV power lines near the distribution transformer 40 (e.g., where the LV power lines converge from multiple subscriber premises). Thus, the repeater may be in communication with multiple user devices at different customer premises 15a-c via the LV power lines. Each encryption key may be used to decrypt and encrypt data for the user device (or another repeater) in the customer premises 15a-c thereby forming a separate logical network for each customer premises 15a-c. Consequently, this embodiment may provide isolation of the user devices of one customer premises 15a from the devices of the other customer premises 15b-c, and vice versa. In addition, a particular customer premises 15a-c may have multiple user devices (or groups thereof with each user device (or group of user devices) using a different encryption key and thereby being on a separate logical network as described herein. In addition, a device in communication with user devices in multiple customer premises that uses different encryption keys for each logical network may take the form of a transformer bypass device (described in the incorporated applications) instead of a repeater.

In addition, the repeater 100 of this embodiment may transmit data upstream through the distribution transformer 40 for reception by one or more PLC network devices communicatively coupled to the MV power line such as a transformer bypass device 30, a MV repeater, or a backhaul device. Likewise, the one or more PLC network devices communicatively coupled to the MV power line may communicate downstream through the distribution transformer to the repeater 100.

Furthermore, the repeater 100 (or bypass device) may communicate with the user devices in numerous customer premises 15*a-c* via an optic fiber, a digital subscribe line (DSL), a coaxial cable, or wirelessly as opposed to via the LV power lines (or in addition to the internal LV power lines).

Likewise, some embodiments may be comprised of three, four or more modems that are coupled together such as via a router. In addition, alternate embodiments may use an algorithm, which simultaneously (or contemporaneously) attempts to decrypt with multiple keys (e.g., all the encryption keys available).

The LV repeater embodiment may be communicatively coupled to the LV power line near the customer premises 15*a-c* or near (e.g., adjacent) the distribution transformer such as mounted on a utility pole or in, on, or to a transformer enclosure. If mounted near the transformer, the repeater 100 may be configured to provide communications for a user device in the customer premises over the LV power line. In addition, the repeater mounted near the transformer may transmit through the transformer onto the MV power line to provide communications between the user device and a MV PLC device such as a transformer bypass device (e.g., bypassing a different transformer), a backhaul point, a communication interface device (as described in the incorporated references), or a MV repeater.

In still another embodiment in which the present invention may be comprised of a single modem, the modem selects an encryption key based on information present in the packet (e.g., in the header of the packet) and information stored in memory (e.g., in the routing or bridge table). After decryption, the packet is encrypted using a different encryption key, which may be selected (e.g., retrieved from memory) based on programming and information stored in memory. After encryption, the packet is transmitted over the power line. In either single modem embodiment, the repeater 100 may also include a router that receives the decrypted packet from the modem and processes it as described above prior to, and to determine whether to, supply the packet back to the modem.

As will be evident from the above description, the repeater may be communicatively coupled (e.g., via the LV power lines) to a plurality of power line modems and associated user devices. Each modem (and associated user device) may use a different encryption key to create multiple logical networks. Alternatively, each user device may use the same encryption key (to permit networking between user devices) and the modems may only repeat data packets (using a different encryption key) with its address. Alternatively, one modem of the repeater and some subset of the user devices may use the same key (while other user devices use different keys), thereby permitting networking between the subset of user devices and to prevent the other devices from accessing the external PLC network.

Preferably, although not necessarily, the components of the repeater (perhaps excluding the coupler) are housed in an enclosure to provide environmental protection. The repeater 100 also may include a serial port, Ethernet port, USB, or a wireless transceiver to permit network personnel to access a processor in the repeater and to communicate with (or through) the user devices and network devices with which the repeater 100 is communicatively coupled.

Typically, each customer premises will be served by two LV energized conductors and a neutral conductor. The two LV energized conductors each carry 120V referenced to ground and are 180 degrees out of phase with each other to provide 240V potential between the two LV energized conductors. After the LV energized conductors enter the customer premises, typically only one LV energized conductor will be present at each wall socket where a power line modem or repeater might be installed (e.g., plugged in). Given this fact regarding the internal customer premises wiring, there is no way to know to which LV energized conductor the power line modem (and user device) or repeater will be connected. In addition, the subscriber may move the power line modem and user device to another socket to access the PLCS and the new socket may be coupled to the second (different) LV energized conductor. Given these facts, the network designer must supply communications on both LV energized conductors and, therefore, would be motivated to simultaneously transmit the PLC RF data signal on each LV energized conductor referenced to the neutral conductor. However, in comparison to transmitting the RF data signals on both energized conductors referenced to the neutral, the following method of providing communications on the LV energized has been found to provide improved performance.

Figure 5:
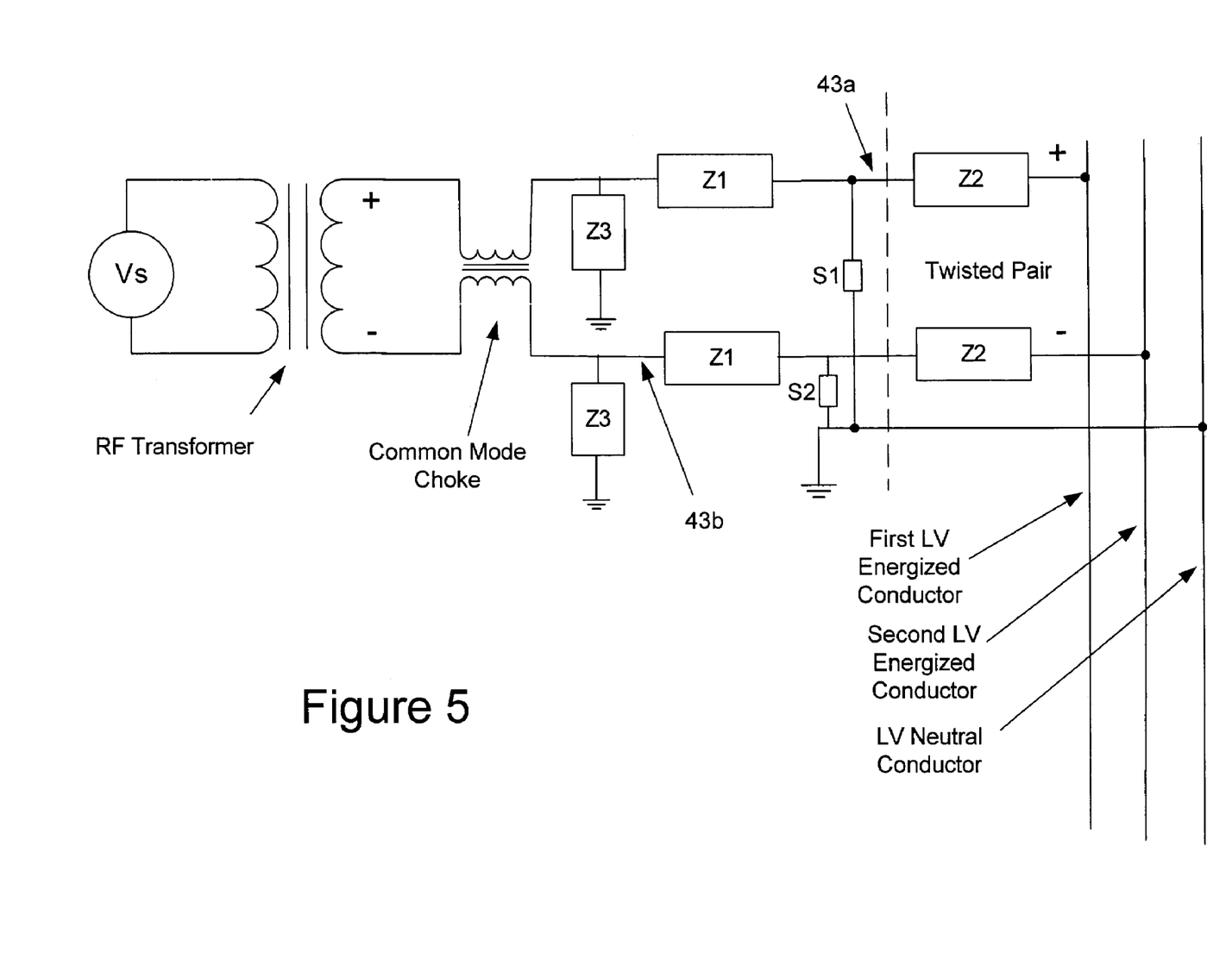
FIG. 5 is a schematic of a portion of an example embodiment of a communication device according to the present invention.

FIG. 5 illustrates an embodiment of a transmit circuit for transmitting the data signal provided by the repeater 100. Components to the left of the dashed line in FIG. 5*c* may be inside the repeater enclosure and those to the right may be outside the repeater enclosure. The transmit circuit of this embodiment (that forms part of or receives signals from a modem in the repeater) is comprised of a transformer that drives one conductor pair 43, which traverse through a common mode choke. The common mode choke provides a very low impedance to differential currents in the two conductors 43*a,b*, but provides a significant or high impedance to common mode currents (i.e., currents traveling in the same direction such as in or out). The two conductors 43*a,b* may also be coupled to ground by an impedance Z3, which may be a resistive impedance. In addition, each conductor 43*a,b* includes a series impedance Z1, which may be a capacitive impedance, or other low pass filter component(s), for impeding the 60 Hz power signal and permitting the RF data signal to pass unimpeded. Such impedances may be on either side of the common mode choke, but are preferably on the LV power line side of the choke.

In either embodiment, each conductor may also include a surge protection circuit, which in FIG. 5 are shown as S1 and S2. Finally, the cable 43 may be comprised of a twisted pair of conductors between the repeater enclosure and LV power line. As will be evident to those skilled in the art, the twisted pair cable 43 may have an impedance (determined by the geometry of the cable) as represented by Z2. This impedance Z2 may be modeled by a resistive component and an inductive component. The inductive component also may cause coupling between the two twisted wired conductors.

While not shown in the figures, the transmit circuit of either embodiment may also include a fuse in series with each conductor and a voltage limiting device, such as a pair of oppositely disposed zener diodes, coupled between the pair of conductors and may be located between the common mode choke and the transformer. Finally, one of the conductors of the repeater cable(s) 43 may be used to supply power to the power supply of the repeater 100 to power the modem(s) and other components of the repeater 100.

While these embodiments of the invention may drive the first and second LV energized conductors differentially to transmit the data signal (e.g., using OFDM), the power line modem (or indoor repeater) may transmit data signals from the customer premises to the repeater 100 by applying the data signal to one conductor (e.g., one energized conductor) referenced to the other conductor such as the ground and/or neutral.

While in this embodiment the two energized conductors are opposite in magnitude, other embodiments may phase shift the signal on one conductor by forty-five degrees, ninety degrees, one hundred twenty degrees, one hundred eighty degrees, or some other value, in addition to or instead of differentially driving the two conductors.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiments. Similarly, while the preferred embodiment employs different encryption keys to isolate for various logical networks other embodiments may use other methods of isolating the logical networks. For example, a LV repeater (or other PLC device such as a bypass device) of another embodiment may use a first modulation scheme to communicate with the user device and another modulation scheme to communicate with another PLC device (e.g., a bypass device). In addition, or instead of, or in addition using different modulation schemes, the invention may use different forward error correction coding rates for each logical network. Thus, different modulation schemes, encryption, keys, and/or forward error correction coding rates can be used to provide isolation of each logical network.

Obviously, numerous modifications and variations of the invention are possible in light of the above teachings. It is therefore to be understood that within the scope of the appended claims, the invention may be practiced otherwise than as specifically described herein.

What is claimed:

1. A device for communicating data over a power line, the device comprising:
   a first modem communicatively coupled to the power line; and
   a second modem communicatively coupled to the power line and said first modem, wherein said first modem is configured to decrypt data received from the power line using a first encryption key and to communicate the data decrypted with the first encryption key to said second modem, and wherein said second modem is configured to decrypt data received from the power line using a second encryption key and to communicate the data decrypted with the second encryption key to said first modem.

2. The device of claim 1, wherein said first modem is configured to encrypt data received from said second modem using said first encryption key and to transmit said encrypted data over the power line.

3. The device of claim 2, wherein said second modem is configured to encrypt data received from said first modem using said second encryption key and to transmit said encrypted data over the power line.

4. The device of claim 3, wherein the data transmitted over the power line by said first modem is transmitted to a transformer bypass device.

5. The device of claim 4, wherein the data received from the power line by said first modem is received from a transformer bypass device.

6. The device of claim 1, wherein the data received from the power line by said first modem is received from a transformer bypass device.

7. The device of claim 1, wherein the power line carries a voltage less than one thousand volts.

8. The device of claim 1, wherein the power line carries a voltage greater than one thousand volts.

9. The device of claim 1, further comprising a router in communication with said first modem and said second modem.

10. The device of claim 9, wherein said communication from said first modem to said second modem and from said second modem to said first modem is controlled, at least in part, by said router.

11. The device of claim 9, wherein said router is configured to perform network address translation of said decrypted data.

12. The device of claim 11, wherein said decrypted data includes information of a port.

13. The device of claim 1, wherein said first modem is communicatively coupled to the power line to communicate data signals over the power line by differentially transmitting said data signals on a first power line conductor and a second power line conductor.

14. The device of claim 13, wherein the first power line conductor is an energized conductor and the second power line conductor is an energized conductor.

15. The device of claim 3, further comprising a router in communication with said first modem and said second modem.

16. The device of claim 1, wherein said communication from said first modem to said second modem and from said second modem to said first modem is via an Ethernet data path.

17. A method of communicating data over a power line, the method comprising:
   receiving data from the power line;
   decrypting the data using a first encryption key;
   encrypting the data using a second encryption key; and
   transmitting the encrypted data over the power line.

18. The method of claim 17, further comprising translating a network address of said decrypted data.

19. The method of claim 18, wherein said data includes information of a port.

20. The method of claim 17, wherein said transmitting comprises differentially transmitting a data signal representing said encrypted data on a first power line conductor and a second power line conductor.

21. The method of claim 20, wherein the first power line conductor is an energized conductor and the second power line conductor is an energized conductor.

22. A method of communicating data over a power line, the method comprising:
   receiving data from the power line;
   attempting to decrypt the received data using a first encryption key;
   determining whether the data has been decrypted by the first encryption key;
   if decryption of the data using the first encryption key is successful, encrypting the decrypted data using a second encryption key;
   attempting to decrypt the received data using a second encryption key;

determining whether decryption of the received data using the second encryption key is successful;

if decryption of the data using the second encryption key is successful, encrypting the decrypted data using the first encryption key; and transmitting the encrypted data over the power line.

23. The method of claim 22, further comprising translating a network address of said decrypted data.

24. The method of claim 23, wherein said data includes information of a port.

25. The method of claim 22, wherein said transmitting comprises differentially transmitting a data signal representing said encrypted data on a first power line conductor and a second power line conductor.

26. The method of claim 25, wherein the first power line conductor is an energized conductor and the second power line conductor is an energized conductor.

27. A method of communicating data over a power line, the method comprising:

receiving data from the power line;

attempting to decrypt the received data using a first encryption key;

determining whether decryption of the received data using the first encryption key is successful;

if decryption of the data using the first encryption key is successful, encrypting the decrypted data using a second encryption key;

if decryption of the data using the first encryption key is not successful performing steps a through c:

(a) attempting to decrypt the received data using a second encryption key, (b) determining whether decryption of the received data using the second encryption key is successful, (c) if decryption of the data using the second encryption key is successful, encrypting the decrypted data using the first encryption key, and transmitting the encrypted data over the power line.

28. A method of communicating data over a power line, the method comprising:

receiving data from the power line;

selecting one of a plurality of encryption keys to decrypt the received data;

decrypting said received data with said selected encryption key;

encrypting said data with a second encryption key; and transmitting the encrypted data over the power line.

29. The method of claim 28, wherein said selecting comprises attempting to decrypt said data with said one of said plurality of encryption keys.

30. The method of claim 28, wherein said selecting comprises attempting to decrypt said data with said plurality of encryption keys.

31. The method of claim 29, wherein said selecting further comprises determining whether said attempting to decrypt said data with said one of said plurality of encryption keys is successful.

32. The method of claim 31, wherein said selecting further comprises:

if said attempting to decrypt said data with said one of said plurality of encryption keys is not successful, attempting to decrypt said data with another of said plurality of encryption keys.

33. The method of claim 28, wherein at least some of said plurality of encryption keys are associated with different communication devices in different subscriber premises.

34. The method of claim 28, further comprising translating a network address of said received data.

35. The method of claim 34, wherein said received data includes information of a port.

36. The method of claim 28, wherein said step of transmitting comprises differentially transmitting a data signal representing the encrypted data on a first power line conductor and a second power line conductor.

37. The method of claim 36, wherein the first power line conductor is an energized conductor and the second power line conductor is an energized conductor.

38. A device for communicating data over a power line, the device comprising:

a first modem communicatively coupled to the power line, wherein said first modem is configured to decrypt first data received from the power line using a first one of a plurality of encryption keys, to encrypt the first data using a second one of said plurality of encryption keys, and to communicate the encrypted first data to the power line; and said encryption key used to encrypt said first data is determined based on a destination address associated with the data.

39. The device of claim 38, wherein said first modem is configured to decrypt second data received from the power line using the second one of said plurality of encryption keys, to encrypt the second data using the first one of said plurality of encryption keys, and to communicate the encrypted second data to the power line.

40. The device of claim 39, wherein the destination address corresponds to one of a plurality of different communication devices in different subscriber premises.

41. The device of claim 38, wherein the destination address corresponds to one of a plurality of different communication devices in different subscriber premises.

42. A method of communicating data over a power line, the method comprising:

receiving data from the power line;

attempting to decrypt the received data using a first encryption key;

determining whether decryption of the received data using the first encryption key is successful;

if decryption of the data using the first encryption key is successful, encrypting the decrypted data using a second encryption key;

if decryption of the data using the first encryption key is not successful performing steps a and b:

(a) decrypting the received data using a second encryption key, (b) encrypting the decrypted data using the first encryption key; and transmitting the encrypted data over the power line.

43. The method of claim 42, further comprising translating a network address of said decrypted data.

44. The method of claim 43, wherein said data includes information of a port.

45. The method of claim 42, wherein said transmitting comprises differentially transmitting a data signal representing said encrypted data on a first power line conductor and a second power line conductor.

46. The method of claim 45, wherein the first power line conductor is an energized conductor and the second power line conductor is an energized conductor.

47. A method of providing communications to a first and second device in a power line communications system having a power line, comprising:
- receiving first data from the power line;
- encrypting first data using a first encryption key;
- transmitting said encrypted first data over the power line for reception by the first device;
- receiving second data from the power line;
- encrypting second data using a second encryption key; and
- transmitting said encrypted second data over the power line for reception by the second device.

48. The method of claim 47, further comprising at the first device:
- receiving said encrypted second data;
- attempting to decrypt said encrypted second data with the first encryption key; and
- determining that said attempt to decrypt said encrypted second data was unsuccessful.

49. The method of claim 48, further comprising at the first device:
- receiving said encrypted first data;
- attempting to decrypt said encrypted first data with the first encryption key; and
- determining that said attempt to decrypt said encrypted first data was successful.

50. The method of claim 47, further comprising at the first device:
- receiving said encrypted first data;
- attempting to decrypt said encrypted first data with the first encryption key; and
- determining that said attempt to decrypt said encrypted first data was successful.

* * * * *

UNITED STATES PATENT AND TRADEMARK OFFICE
CERTIFICATE OF CORRECTION

| | | |
|---|---|---|
| PATENT NO. | : 7,308,103 B2 | |
| APPLICATION NO. | : 10/434024 | |
| DATED | : December 11, 2007 | |
| INVENTOR(S) | : Corcoran et al. | |

It is certified that error appears in the above-identified patent and that said Letters Patent is hereby corrected as shown below:

Title page 4, in field (56), under "Other Publications", in column 1, line 12, delete "Mar. 3, 2003," and insert -- Mar. 10, 2003, --, therefor.

Title page, 4, in field (56), under "Other Publications", in column 1, line 17, delete "Systems" and insert -- System --, therefor.

Title page 4, in field (56), under "Other Publications", in column 1, line 29, delete "Communicaiton" and insert -- Communication --, therefor.

Title page 4, in field (56), under "Other Publications", in column 1, line 58, delete "TSP50711," and insert -- TSP507/1, --, therefor.

Title page 4, in field (56), under "Other Publications", in column 1, line 63, delete ""Plexecon" and insert -- "Plexeon --, therefor.

Title page 4, in field (56), under "Other Publications", in column 1, line 64, delete "plexecon.com" and insert -- plexeon.com --, therefor.

Title page 4, in field (56), under "Other Publications", in column 2, line 6, delete "Dellivery," and insert -- Delivery, --, therefor.

Title page 4, in field (56), under "Other Publications", in column 2, line 26, delete "electronic" and insert -- electric --, therefor.

Title page 4, in field (56), under "Other Publications", in column 2, line 60, delete "Applicaitons," and insert -- Applications, --, therefor.

Title page 4, in field (56), under "Other Publications", in column 2, line 64, delete "Transacitons" and insert -- Transactions --, therefor.

Title page 4, in field (56), under "Other Publications", in column 2, line 70, delete "Transacitons" and insert -- Transactions --, therefor.

Title page 5, in field (56), under "Other Publications", in column 1, line 5, delete "Telecommunicaitons" and insert -- Telecommunications --, therefor.

UNITED STATES PATENT AND TRADEMARK OFFICE
CERTIFICATE OF CORRECTION

PATENT NO. : 7,308,103 B2
APPLICATION NO. : 10/434024
DATED : December 11, 2007
INVENTOR(S) : Corcoran et al.

It is certified that error appears in the above-identified patent and that said Letters Patent is hereby corrected as shown below:

Title page 5, in field (56), under "Other Publications", in column 1, line 7, delete "Communicaitons U sing" and insert -- Communications Using --, therefor.

Title page 5, in field (56), under "Other Publications", in column 1, line 9, delete "Delilvery," and insert -- Delivery, --, therefor.

Title page 5, in field (56), under "Other Publications", in column 1, line 9, delete "8778" and insert -- 878 --, therefor.

Title page 5, in field (56), under "Other Publications", in column 1, line 12, delete "Communicaitons," and insert -- Communications, --, therefor.

Title page 5, in field (56), under "Other Publications", in column 1, line 23, delete "Transacitons" and insert -- Transactions --, therefor.

Title page 5, in field (56), under "Other Publications", in column 2, line 5, delete "Applicaitons" and insert -- Applications --, therefor.

Title page 5, in field (56), under "Other Publications", in column 2, line 13, delete "Allliance," and insert -- Alliance, --, therefor.

Title page 5, in field (56), under "Other Publications", in column 2, line 15, delete "PCt" and insert -- PCT --, therefor.

Title page 5, in field (56), under "Other Publications", in column 2, line 18, delete "PCt" and insert -- PCT --, therefor.

Title page 5, in field (56), under "Other Publications", in column 2, line 20, delete "PCt" and insert -- PCT --, therefor.

UNITED STATES PATENT AND TRADEMARK OFFICE
CERTIFICATE OF CORRECTION

PATENT NO. : 7,308,103 B2
APPLICATION NO. : 10/434024
DATED : December 11, 2007
INVENTOR(S) : Corcoran et al.

It is certified that error appears in the above-identified patent and that said Letters Patent is hereby corrected as shown below:

In column 4, line 25, delete "bidirectional" and insert -- bi-directional --, therefor.

In column 8, line 51, after "thereof" insert -- ) --.

Signed and Sealed this

Twenty-ninth Day of April, 2008

JON W. DUDAS
*Director of the United States Patent and Trademark Office*